US008550800B2

(12) United States Patent  
Miyagawa et al.

(10) Patent No.: US 8,550,800 B2  
(45) Date of Patent: Oct. 8, 2013

(54) INJECTION MOLDING MACHINE FOR TWO-MATERIAL MOLDING

(75) Inventors: Satoshi Miyagawa, Nagoya (JP); Naoki Kato, Nagoya (JP); Yasuaki Ozeki, Nagoya (JP); Hiroto Matsushita, Nagoya (JP); Masamitsu Saji, Nagoya (JP); Yasuo Okochi, Nagoya (JP); Toshihiko Kariya, Nagoya (JP); Koji Kubota, Nagoya (JP)

(73) Assignee: Mitsubishi Heavy Industries Plastic Technology Co., Ltd., Nagoya-shi, Aichi (JP)

( * ) Notice: Subject to any disclaimer, the term of this patent is extended or adjusted under 35 U.S.C. 154(b) by 155 days.

(21) Appl. No.: 13/377,748

(22) PCT Filed: Dec. 7, 2009

(86) PCT No.: PCT/JP2009/006678  
§ 371 (c)(1),  
(2), (4) Date: Dec. 12, 2011

(87) PCT Pub. No.: WO2011/070608  
PCT Pub. Date: Jun. 16, 2011

(65) Prior Publication Data  
US 2012/0087999 A1   Apr. 12, 2012

(51) Int. Cl.  
*B29C 45/73*   (2006.01)

(52) U.S. Cl.  
USPC ............ 425/130; 264/255; 425/548; 425/552

(58) Field of Classification Search  
USPC ................... 425/130, 547, 548, 552; 264/255  
See application file for complete search history.

(56) References Cited

U.S. PATENT DOCUMENTS 8,470,228 B2 * 6/2013 Armbruster .................. 264/255  
2003/0099794 A1 5/2003 Sasaki et al.  
(Continued)

FOREIGN PATENT DOCUMENTS

JP      61-012087 Y2   4/1986  
JP       3-51207 B2    8/1991  
(Continued)

OTHER PUBLICATIONS

Notice of Allowance dated Sep. 5, 2012, issued in corresponding Japanese Patent Application No. 2008-164139, with English translation (5 pages).

(Continued)

*Primary Examiner* — Tim Heitbrink  
(74) *Attorney, Agent, or Firm* — Westerman, Hattori, Daniels & Adrian, LLP

(57) ABSTRACT

It is an object to prevent dies from interfering with each other when the dies are closed and effectively prevent overshoot of cavity temperature while efficiently performing heating of the dies. In an injection molding machine for two-material molding including two sets of a first injecting unit and a second injecting unit that respectively plasticize different resin materials and inject and fill the resin materials, prior to performing injection molding on the first injecting unit side on a secondary side, after injection molding on the second injecting unit side on a primary side, heating of the dies is started before 180-degree rotation of a rotary die plate is completed. After the start of heating, until the 180-degree rotation of the rotary die plate is completed, i.e., die closing is performed, die temperatures are maintained within a temperature range set higher than die temperatures during the heating start and lower than die temperatures during injection.

9 Claims, 16 Drawing Sheets

(56) References Cited

U.S. PATENT DOCUMENTS

| | | | |
|---|---|---|---|
| 2006/0099424 A1* | 5/2006 | Hagiwara et al. | 428/411.1 |
| 2006/0244178 A1* | 11/2006 | Armbruster | 264/255 |
| 2009/0179345 A1* | 7/2009 | Sicilia | 264/219 |
| 2010/0171237 A1* | 7/2010 | Armbruster | 264/255 |

FOREIGN PATENT DOCUMENTS

| | | |
|---|---|---|
| JP | 5-084747 A | 4/1993 |
| JP | 10-323843 A | 12/1998 |
| JP | 2000-309045 A | 11/2000 |
| JP | 2005-169925 A | 6/2005 |
| JP | 2006-168223 A | 6/2006 |
| JP | 4060000 B2 | 3/2008 |
| JP | 2008-080670 A | 4/2008 |
| JP | 2008-279784 A | 11/2008 |
| JP | 2008-290384 A | 12/2008 |
| JP | 2009-023267 A | 2/2009 |
| JP | 2009-119692 A | 6/2009 |

OTHER PUBLICATIONS

International Search Report of PCT/JP2009/006678, mailing date Feb. 23, 2010.

Notification of Transmittal of Translation of the International Preliminary Report on Patentabililty (Form PCT/IB/338) of International Application No. PCT/JP2009/006678 mailed Jul. 19, 2012 with Forms PCT/IB/373 and PCT/ISA/237.

Japanese Office Action dated Jun. 20, 2012, issued in corresponding Japanese Patent Application No. 2008-164139, with English translation (8 pages).

* cited by examiner

A-A

INJECTION MOLDING MACHINE FOR TWO-MATERIAL MOLDING

TECHNICAL FIELD

The present invention relates to an injection molding machine for two-material molding for obtaining a molded product formed by combining different materials or different colors.

BACKGROUND ART

In order to obtain a molded product formed by plural kinds of materials different from one another or materials of plural colors different from one another, there is a method of using an injection molding machine including a cavity on a primary side and a cavity on a secondary side (e.g., see Patent Documents 1 and 2). This injection molding machine includes a stationary die plate, a movable die plate that can approach and separate from the stationary die plate, and a rotary die plate provided between the stationary die plate and the movable die plate. Dies are respectively attached to the stationary die plate and the movable die plate. Dies are respective provided on both surfaces of the rotary die plate to be opposed to the die of the stationary die plate and the die of the movable die plate. The rotary die plate is rotatably provided. The rotary die plate is rotated, whereby the respective dies provided on both the surfaces thereof are alternately opposed to the die of the stationary die plate and the die of the movable die plate.

First, in a state in which one die of the rotary die plate is opposed to the die of the movable die plate, first resin is injected to a cavity on a primary side formed between the dies and is pressure-molded. Subsequently, the rotary die plate is rotated with an obtained molded product kept attached to the die of the rotary die plate and opposed to the die of the stationary die plate. Second resin is injected to a cavity on a secondary side formed between the die of the stationary die plate and the die of the rotary die plate and is pressure-molded.

In this way, a molded product formed by the first resin and the second resin having different materials and different colors can be obtained.

CITATION LIST

Patent Document

Patent Document 1: Japanese Patent Publication No. 3-51207
Patent Document 2: Japanese Patent Laid-Open No. 2006-168223

SUMMARY OF INVENTION

Technical Problem

In recent years, a method of heating dies to increase fluidity of resin to extend the resin to every corner of a cavity when the resin is injected and then cooling the dies to cool the resin in the cavity to highly accurately perform pattern transfer is being used.

When it is attempted to apply the method of performing temperature control for the dies to the injection molding machine for two materials having plural cavities, there are problems explained below.

The heating of the dies needs to be started in the cavity on the secondary side after die closing, i.e., the die of the rotary die plate and the die of the stationary die plate are closed. This is because, if the dies are heated in a state in which the dies are open, when the die of the rotary die plate and the die of the stationary die plate are about to be closed, both the dies interfere with each other because of, for example, a difference in an expansion amount. However, if the heating is started after the dies are closed, the heating takes time and improvement of productivity is hindered.

Further, if the dies are heated in a state in which the dies are open, the dies radiate a part of the heat to the atmosphere around the dies. Therefore, it is necessary to apply, to the dies, an excessive heat quantity including a heat quantity radiated to the atmosphere around the dies by the dies. If the dies are closed in this state, the heat from the dies is radiated to the cavity. However, since the cavity is a closed space, a heat radiation amount is small compared with the state in which the dies are open. As a result, if the dies are closed, the temperature of the dies rapidly rises. Consequently, cavity temperature exceeds target temperature set in advance. This leads to a molding failure or the like. Such a so-called overshoot phenomenon becomes more conspicuous as the heating is performed more rapidly.

The present invention has been devised on the basis of such technical problems and it is an object of the present invention to provide an injection molding machine for two-material molding that can prevent dies from interfering with each other when the dies are closed and effectively prevent overshoot of cavity temperature while efficiently performing heating of the dies.

Solution to Problem

Under such an object, an injection molding machine for two-material molding according to the present invention includes: a first die plate attached with a first die; a second die plate attached with a second die and opposed to the first die plate; a reversal pedestal provided between the second die plate and the first die plate; a rotary die plate provided on the reversal pedestal to be rotatable 180 degrees, on both surfaces of the rotary die plate being respectively attached with rotary dies alternately opposed to the second die and the first die; first die opening and closing means for enabling the first die plate and the second die plate to relatively open and close in a direction in which the first die plate and the second die plate approach and separate from each other; second die opening and closing means for enabling the first die plate and the rotary die plate to relatively open and close in the same direction as the direction of the second die plate; die tightening means for tightening the first die plate, the second die plate, and the rotary die plate; a first injecting unit that plasticizes a resin material and injects and fills the resin material in a first cavity formed between the first die and the rotary die opposed to the first die; a second injecting unit that plasticizes a resin material and injects and fills the resin material in a second cavity formed between the second die and the rotary die opposed to the second die; a heating device that heats at least one of the first die, the second die, and the rotary dies; a cooling device that cools at least one of the first die, the second die, and the rotary dies; and a control unit that controls the heating device and the cooling device, wherein after completion of injection molding in the first injecting unit or the second injecting unit, before the reversal pedestal is rotated 180 degrees in order to inject and fill the resin material in the first injecting unit and the second injecting unit, the control unit issues a heating start command to the heating device, starts heating of the first cavity and/or the second cavity, and heats the first cavity and/or the second cavity to a temperature set in advance before completion of the rotation of the reversal pedestal.

After the completion of the injection molding in the first injecting unit or the second injecting unit, before the reversal pedestal is rotated 180 degrees in order to inject and fill the resin material in the second injecting unit or the first injecting unit, the heating of the first cavity and/or the second cavity is started by the heating device. Therefore, it is possible to reduce time required to heat the first cavity and/or the second cavity with the heating device after the reversal pedestal is rotated 180 degrees. Heating until the completion of the rotation of the reversal pedestal is retained at temperature set in advance to prevent the temperatures of the first die, the second die, and the rotary dies from interfering with one another when the first die and the rotary die opposed to the first die and the second die and the rotary die opposed to the second die are closed after the reversal pedestal is rotated 180 degrees.

The first die plate, the second die plate, and the rotary die plate may have any configuration as long as the die plates can approach and separate from each other and can be opened and closed.

For example, the first die plate can be a stationary die plate fixed to a base of the injection molding machine for two-material molding, the second die plate can be a movable die plate made movable in a direction in which the movable die plate approaches and separates from the stationary die plate, the first die opening and closing means can open and close the movable die plate with respect to the stationary die plate to enable the stationary die plate and the movable die plate to relatively open and close in a direction in which the stationary die plate and the movable die plate approach and separate from each other, and the second die opening and closing means can open and close the rotary die plate with respect to the stationary die plate to enable the stationary die plate and the rotary die plate to relatively open and close in the same direction as the direction of the movable plate.

Each of the first die plate and the second die plate can be made movable, with respect to the base of the injection molding machine for two-material molding, in a direction in which the first die plate and the second die plate approach and separate from each other, the reversal pedestal can be fixed to the base in the direction in which the first die plate and the second die plate approach and separate from each other, the first die opening and closing means can cause the first die plate to approach and separate from the reversal pedestal to open and close the first die plate, and the second die opening and closing means can cause the second die plate to approach and separate from the reversal pedestal to open and close the second die plate.

Injection order in the first injecting unit and the second injecting unit may be any order. In the first cavity and the second cavity, different colors, different materials, and different molding methods can be combined. The heating may be performed in any one of the first cavity and the second cavity or both. Similarly, the heating device only has to be formed in at least one of the first die, the second die, and the rotary dies.

The heating device may be a heating medium supply device that supplies a heating medium to a heat medium passage formed in at least one of the first die, the second die, and the rotary dies and heats the first cavity and/or the second cavity, the cooling device may be a cooling medium supply device that supplies a cooling medium to the heat medium passage and cools the first cavity and/or the second cavity, and the control unit may control the supply of the heating medium and the cooling medium in the heating medium supply device and the cooling medium supply device.

Alternatively, the heating device may be an electric or electromagnetic heating device formed in at least one of the first die, the second die, and the rotary dies, the cooling device may be a cooling medium supply device that supplies a cooling medium to a heat medium passage formed in at least one of the first die, the second die, and the rotary dies and cools the first cavity and/or the second cavity, and the control unit may control supply of electricity in the electric or electromagnetic heating device and the supply of the cooling medium in the cooling medium supply device. Since the heating device is the electric or electromagnetic heating device in this way, a supply path for supplying the heating medium to the rotary dies can be only a supply path for the cooling medium. Therefore, a seal structure for preventing leakage of the medium to the outside or mutual leakage in a medium channel can be simplified. Further, when a channel for the heat medium is internally provided in the reversal pedestal, the size of the reversal pedestal can be reduced. This is effective for simplification of a design and a reduction in cost.

The control unit desirably maintains the first cavity and/or the second cavity within a temperature range set in advance while the reversal pedestal is rotated 180 degrees prior to the injection and filling in the second injecting unit or the first injecting unit after the completion of the injection molding in the first injecting unit or the second injecting unit. Since the first cavity and/or the second cavity is maintained within the temperature range set in advance, it is possible to efficiently perform the heating after the reversal pedestal is rotated 180 degrees while reliably preventing the temperature of the stationary side die, the movable side die, and the rotary dies from excessively rising.

The conventional molding apparatus disclosed in Patent Document 1 is explained. From two sets of injecting units, one resin material is injection-molded on a primary side of two cavities formed by a die of a movable platen, a die of a stationary platen, and dies on both sides of a rotary platen set between both the platens, the rotary platen is rotated 180 degrees, and the other resin material is injected to a cavity on the secondary side to integrally mold the two materials. In such an injection molding machine for two-material molding, the movement of the rotary platen is performed by a dedicated hydraulic cylinder, the opening and closing of the movable platen is performed by a hydraulic cylinder including a ram at an end of a tie bar provided piercing through the movable platen, the rotary platen, and the stationary platen and a cylinder fixedly provided in the stationary platen, and the rotation of the rotary platen is performed by unspecified rotation driving means. Die tightening after closing the movable platen, the rotary platen, and the stationary platen is performed by a die tightening cylinder including a large-diameter hydraulic cylinder built in the stationary platen and a ram slidable in this cylinder. This large-diameter ram includes a function such that the large-diameter ram is detachably attached to the tie bar.

A molding action by this injection molding machine attracts the rotary platen to the stationary platen side with the dedicated hydraulic cylinder and moves the movable platen to the stationary platen side with the hydraulic cylinder provided between the end of the tie bar and the stationary platen to close the dies. The movable platen and the rotary platen are tightened together by the die tightening cylinder and hydraulic fluid is boosted to tighten the dies and one resin material is injection-molded in the cavity on the primary side from one injecting unit. Thereafter, the rotary platen is reversely rotated 180 degrees to tighten the movable platen and the rotary platen together again and the other resin material is injected to the cavity on the secondary side from another injecting unit to integrally mold the two materials.

In the conventional example disclosed in Patent Document 1, the die opening and closing of the movable platen and the rotary platen is performed by the hydraulic cylinder. However, the die platens have large weights. Therefore, it is difficult to perform highly accurate control of speed and a position corresponding to a temperature change of the hydraulic fluid in operation. If the die opening and closing is performed at high speed, the dies are likely to be broken. If the die opening and closing of the movable platen and the die opening and closing of the rotary platen are actuated in parallel by hydraulic systems that share a hydraulic pump, hydraulic pressure fluctuations involved in the actuation affect each other. Therefore, it is likely that a flow rate of the hydraulic fluid supplied to the hydraulic cylinders for die opening and closing does not stabilize and operations of the hydraulic cylinders fluctuate. It is not easy to increase speed of die opening and closing operations by the hydraulic cylinders. Patent Document 1 does not refer to rotation driving means for the rotary platen. However, the rotary platen also has large weight and rotation moment of the rotary platen is also large. Therefore, if a hydraulic cylinder or a hydraulic motor is used, problems same as those explained above occur.

Therefore, to cope with the problems explained above, it can also be an object of the present invention to provide a rotary die platen that can be replaced with a standard die and die platen driving means capable of highly accurately and stably operating die opening and closing of the movable platen and the rotary platen even during high-speed actuation.

Therefore, in the injection molding machine for two-component molding according to the present invention, the die tightening means can be driven by a hydraulic cylinder and the first die opening and closing means and the second die opening and closing means can be respectively driven by electric motors.

The first die opening and closing means can include a ball screw shaft driven by the electric motor and a ball screw nut attached to the second die plate and screwed with the ball screw shaft and the second die opening and closing means can include a ball screw shaft driven by the electric motor and a ball screw nut attached to the reversal pedestal and screwed with the ball screw shaft.

The first die opening and closing means can include a ball screw shaft driven by the electric motor fixed to the first die plate or the base of the injection molding machine for two-material molding and a ball screw nut attached to the second die plate and screwed with the ball screw shaft.

The first die opening and closing means can include a ball screw shaft driven by the electric motor fixed to the reversal pedestal, the ball screw shaft being rotatably supported via a ball bearing on a support table fixedly provided in the reversal pedestal, and a ball screw nut fixedly provided in the second die plate and screwed with the ball screw shaft.

The injection molding machine for two-material molding according to the present invention can further include control devices that respectively feedback-control operations of the electric motors for the first die opening and closing means and the second die opening and closing means.

In that case, at least one of the electric motors is desirably a servo motor.

In speed control in the feedback control, speed control during acceleration or during deceleration desirably performs acceleration or deceleration according to a linear line at fixed acceleration. Speed control during switching from acceleration control to constant speed control or during switching from the constant speed control to deceleration control is desirably performed according to a quadratic curve, tangential lines of which are respectively linear line speeds of acceleration and constant speed or the constant speed and deceleration.

In the rotary die plate, a driving device for intra-die movable member actions such as a molded product ejecting action in a die, a movable telescopic action, and a gate valve action can also be provided.

Further, a communication device that can transmit and receive control signals by radio in action control for a molded product ejecting device can also be provided.

The present invention can also be a control method for an injection molding machine for two-material molding for controlling, using the injection molding machine for two-material molding explained above, acceleration, speed maintenance, and deceleration with an electric motor such that a die opening and closing movement time of the first die plate, the second die plate, and the rotary die plate is minimized in a molding process of die closing and die tightening of the first die plate, the second die plate, and the rotary die plate, injection and filling and cooling of molten resin, die opening and movement of the first die plate, the second die plate, and the rotary die plate, 180-degree rotation of the rotary die plate, re-die closing and die tightening of the first die plate, the second die plate, and the rotary die plate.

The present invention can also be a control method for an injection molding machine for two-material molding for controlling, using the injection molding machine for two-material molding explained above, rotation acceleration, rotation speed maintenance, and rotation deceleration with an electric motor such that a rotation time is minimized when the rotary die plate on the reversal pedestal is rotated 180 degrees.

Further, it is desirable to set a distance necessary for the first die plate, the second die plate, or the rotary die plate in relative movement to stop as a collision prevention distance, monitor respective movement distal end position of the first die plate, the second die plate, and the dies and the rotary die plate and the die, and automatically decelerate or stop an approaching one of the die plates in movement to prevent collision during opening and closing movement of the first die plate, the second die plate, and the rotary die plate if relative positions of movement distal ends of both the die plates or the respective dies enter the collision prevention distance.

It is desirable to calculate, when opening and closing movement of the first die plate, the second die plate, and the rotary die plate and rotation of the rotary die palate are performed in parallel, relative distances between the rotary die plate in rotary die plate rotation or the die thereof and the first die plate or the die thereof and the rotary die plate or the die thereof and the second die plate or the die thereof from the position of the second die plate and the position and the rotation angle of the rotary die plate with respect to the first die plate and shape dimensional values of the respective dies and automatically decelerate or stop the movement of an approaching one of the die plates or the rotation of the rotary die plate when the relative distances enter the collision prevention distance.

By electrically performing the die opening and closing and smoothly performing acceleration and deceleration as explained above, speed accuracy and position accuracy during relative movement of the first die plate, the second die plate, and the rotary die plate are improved, collision is avoided even in high-speed operation, and breakage of the dies due to a shock can be prevented.

The increase in speed of reversal and a reduction in a die opening and closing time for reversal can reduce time in which a molded product is exposed to the atmosphere and can suppress inconveniences associated with a temperature fall of the molded product. If the molded product is exposed to the atmosphere, the surface temperature of the molded product falls and adhesion of two materials for integral molding of the two materials falls. Therefore, it is advisable to set the time in which the molded product is exposed to the atmosphere to about 40 to 50 seconds and desirably 30 seconds or less in practical use. It is advisable to set the time more desirably to 20 seconds or less. The highly accurate control of the rotation stop position has an effect of facilitating and ensuring fitting with a positioning pin. Further, cleanness of a molding apparatus is improved by electrically driving most of the actions of the die plates.

Advantageous Effects of Invention

According to the present invention, it is possible to prevent the dies from interfering with each other when the dies are closed and prevent overshoot of cavity temperature while efficiently performing heating of the dies.

According to the present invention, by electrically performing the die opening and closing and smoothly performing acceleration and deceleration as explained above, speed accuracy and position accuracy during relative movement of the first die plate, the second die plate, and the rotary die plate are improved, collision is avoided even in high-speed operation, and breakage of the dies due to a shock can be prevented.

Since the dedicated moving means (the ball screw shaft, the ball screw nut, the servo motor, etc.) are respectively provided for opening and closing by relative movement of the second die plate and the rotary die plate with respect to the first die plate, simultaneous movement of the second die plate and the rotary die plate with respect to the first die plate is possible. It is possible to highly accurately control die opening and closing of the second die plate and the rotary die plate while linking the second die plate and the rotary die plate with the molded product ejecting device taking into account the relative positions of the second die plate and the rotary die plate. This is effective for a reduction in a molding cycle and reproducibility of the positions of the dies is high. Therefore, it is possible to prevent a chuck mistake during molded product ejection.

By electrically driving the reversal of the rotary die plate and smoothly performing acceleration and deceleration of rotation, it is easy to perform control for suppressing vibration during rotation start and during rotation stop of the reversal driving and control of high-speed rotation. Therefore, even if the opening and closing action of the second die plate and the rotary die plate with respect to the first die plate and the rotating action of the rotary die plate are performed in parallel, it is possible to perform position control for preventing contact and collision and realize high-cycle molding.

DESCRIPTION OF EMBODIMENTS

The present invention is explained in detail below with reference to the drawings. The present invention is not limited by the embodiments. Components in the embodiments described below include components that can be easily assumed by those skilled in the art or components substantially the same as the components.

First Embodiment

A first embodiment is explained below on the basis of the drawings.

Figure 1:
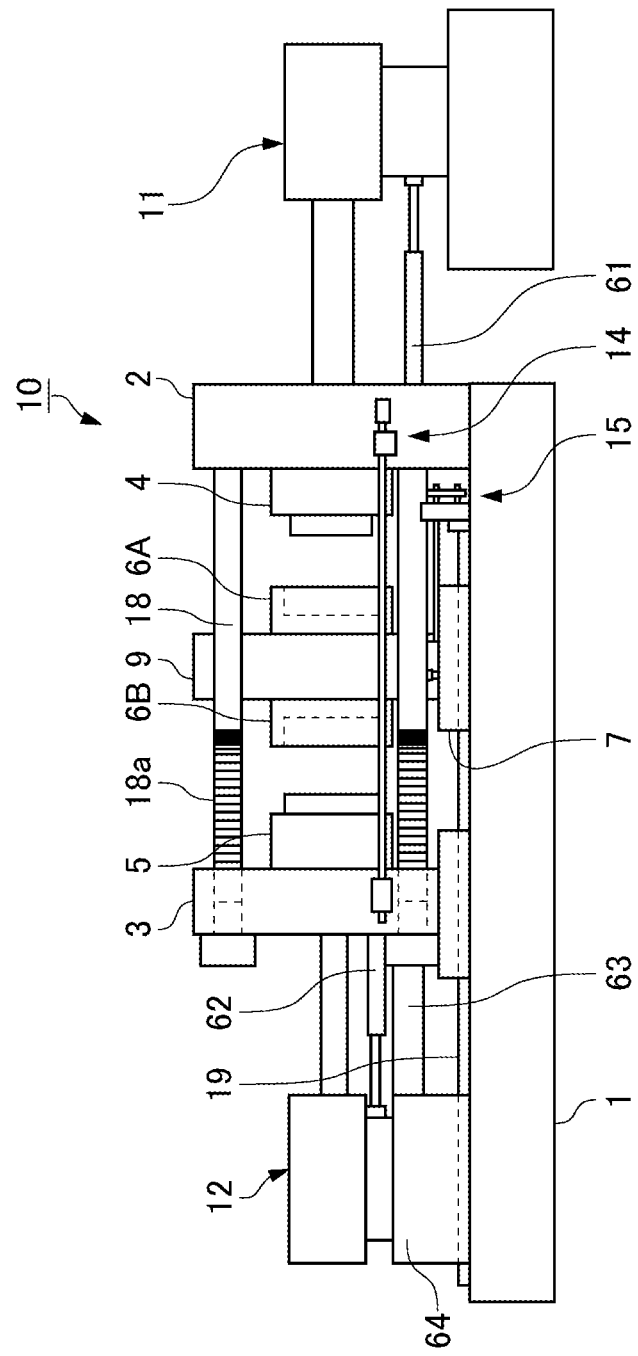
FIG. 1 is a side view of an injection molding machine for two-material molding according to a first embodiment of the present invention.

As shown in FIG. 1, at an end of a base 1 of an injection molding machine for two-material molding 10, a stationary die plate 2 attached with a stationary side die (a first die) 4 is provided in a stationary state. On the base 1, a rotary die plate (a first die plate) 9 attached with a rotary die A (6A) and a rotary die B (6B) and a movable die plate (a second die plate) 3 attached with a movable side die (a second die) 5 are movably placed to be opposed to the stationary die plate 2.

The movable die plate 3 and a reversal pedestal 7 on which a rotary die plate 9 is placed are guided by a guide rail 19 fixedly provided on the base 1 and are made movable on the base 1.

The movable die plate 3 and the reversal pedestal 7 are desirably guided by the guide rail 19 and move. However, in the present invention, there is no practical problem even if the movable die plate 3 and the reversal pedestal 7 are guided by, for example, a sliding plate.

Next, opening and closing means for the movable die plate 3 and the rotary die plate 9 and rotating means for the rotary die plate 9 are explained. In the following explanation, in the injection molding machine for two-material molding 10, concerning members symmetrically provided with reference to the center axis of the injection molding machine for two-material molding 10, in some case, reference numerals and signs are affixed on one side in the figures.

Figure 2:
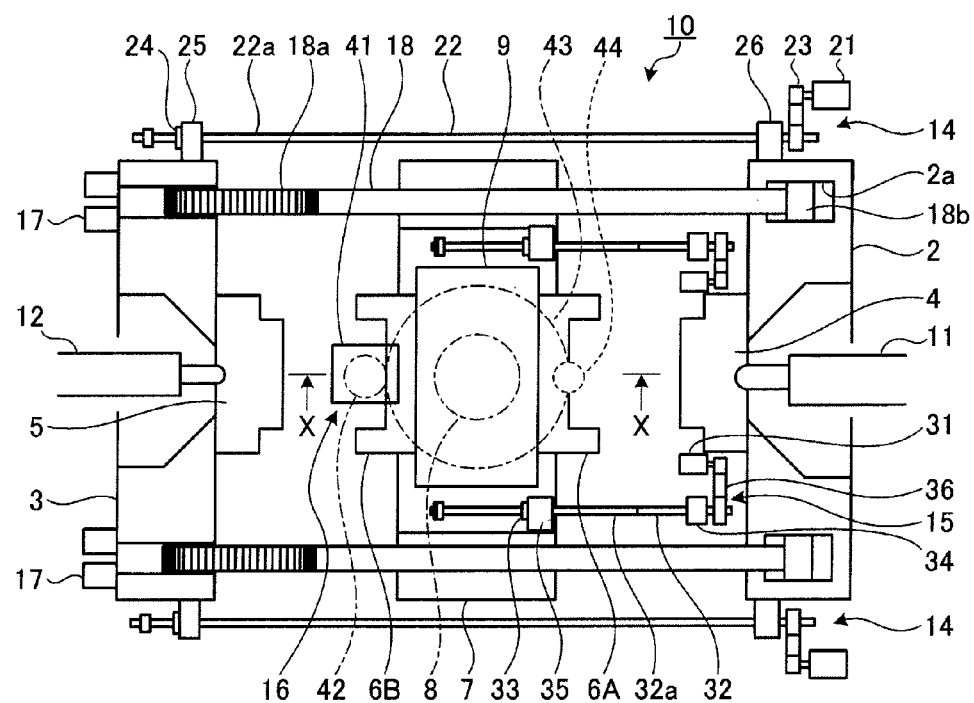
FIG. 2 is a plan schematic view of the injection molding machine for two-material molding shown in FIG. 1.

As shown in FIG. 2, a pair of movable die plate opening and closing means (first die opening and closing means) 14 symmetrically set on both sides of the injection molding machine for two-material molding 10 include servo motors A (electric motors) (21) fixedly provided on the base 1 or the stationary die plate 2, ball screw shafts A (22), supporting tables 26 fixedly provided on the base 1 or the stationary die plate 2 and rotatably restraining and supporting the axis direction of the ball screw shafts A (22), ball screw nuts A (24) screwed with ball screws 22a of the ball screw shafts A (22), nut supporting tables 25 attached with the ball screw nuts A (24) and fixedly provided on the movable die plate 3, and power transmitting mechanisms 23 (e.g., gear pulleys, toothed belts, or gear reduction machines) that transmit rotation force of the servo motors A (21) to the ball screw shafts A (22). The pair of servo motors A (21) are synchronously operated. The movable die plate 3 can be opened and closed and moved in parallel to the stationary die plate 2.

A pair of rotary die plate opening and closing means (second die opening and closing means) 15 symmetrically set on both the sides of the injection molding machine for two-material molding 10 include servo motors B (electric motors) (31) fixedly provided on the base 1 or the stationary die plate 2, ball screw shafts B (32), supporting tables 34 fixedly provided on the base 1 or the stationary die plate 2 and rotatably supporting the ball screw shafts B (32), ball screw nuts B (33) screwed with the ball screws 32a of the ball screw shafts B (32), nut supporting tables 35 attached with the ball screw nuts B (33) and fixedly provided on the reversal pedestal 7, and power transmitting mechanisms 36 (e.g., gear pulleys, toothed belts, or gear reduction machines) that transmit rotation force of the servo motors B (31) to the ball screw shafts B (32). The pair of servo motors B (31) are synchronously operated. The reversal pedestal 7 can be opened and closed and moved in parallel to the stationary die plate 2.

Figure 3:
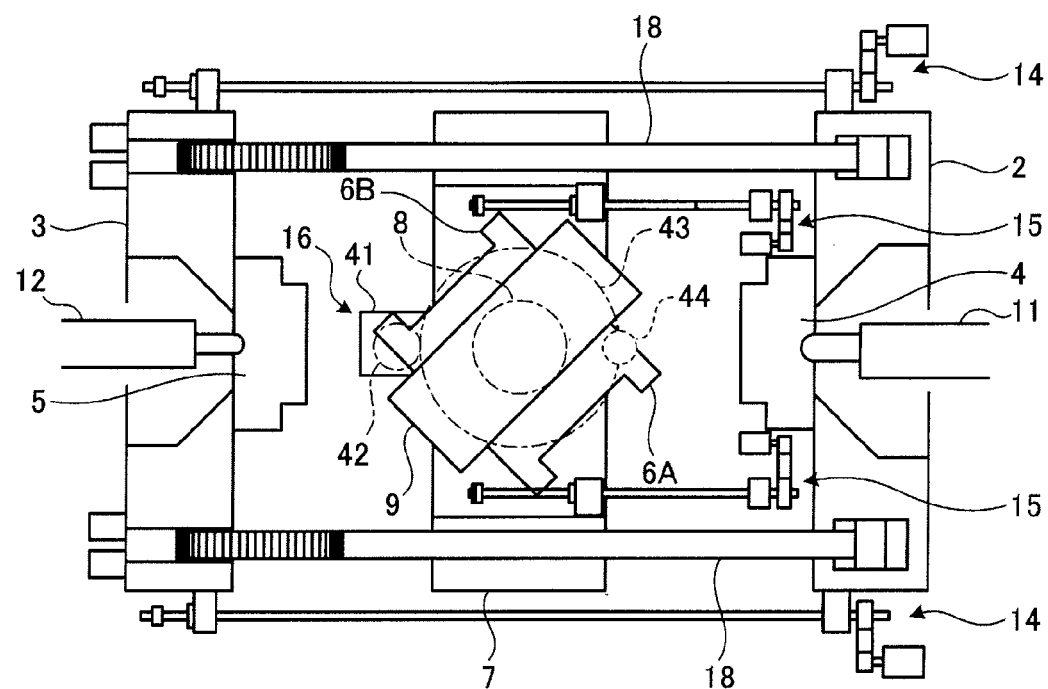
FIG. 3 is a diagram showing a rotating action of a rotary die plate of the injection molding machine for two-material molding shown in FIG. 1.

The rotary die plate 9 is placed on the reversal pedestal 7. As shown in FIG. 3, the rotary die plate 9 is rotatable about an axis orthogonal to the surface of the base 1. The rotary die plate rotating means 16 is rotation driving means for half-rotating the rotary die plate 9 in normal and opposite directions. The rotary die plate rotating means 16 can alternately set the rotary die A (6A) and the rotary die B (6B) provided on both surfaces of the rotary die plate 9 to be placed face to face with the stationary side die 4 and the movable side die 5.

Figure 4:
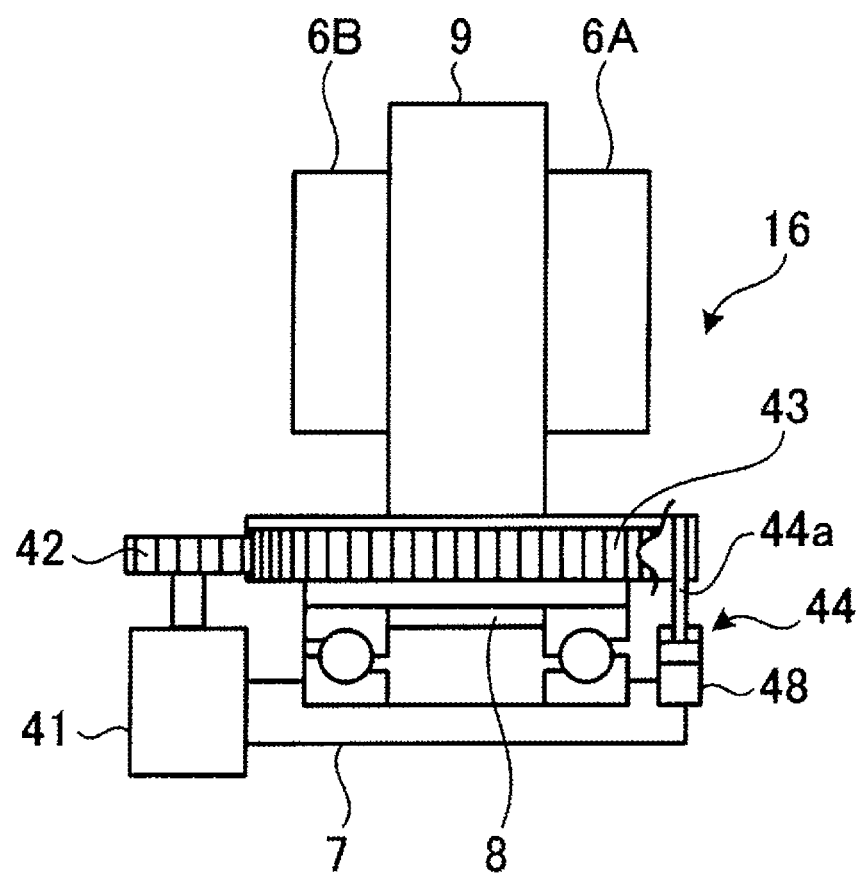
FIG. 4 is an X-X arrow side view showing a schematic configuration of the rotary die plate shown in FIG. 2.

As shown in FIG. 4, the rotary die plate rotating means 16 includes a servo motor C (an electric motor) (41) attached to the reversal pedestal 7, a pinion 42 attached to the servo motor C (41), a large gear 43 integrally provided in the rotary die plate 9, and a positioning pin 44 that positions the rotary die plate 9 in the position of the stationary die plate 2 (or the movable die plate 3) and a position rotated 180 degrees from the position. A lower shaft 8 integral with the rotary die plate 9 is rotatable with respect to the reversal pedestal 7 via a bearing.

Consequently, it is possible to realize positioning at high accuracy.

In this positioning, in a position that is face to face with a die plate opposed to the rotary die plate 9 rotating on the reversal pedestal 7, a positioning pin 44a may be insertable into a not-shown positioning pin insertion hole, which is formed in the large gear 43, by a hydraulic cylinder 48. During the rotation of the rotary die plate 9, control for starting an inserting action of the positioning pin 44a by the hydraulic cylinder 48 may be performed from a predetermined position before the rotation center of the positioning pin 44a and the center of the positioning pin insertion hole coincide with each other.

Consequently, it is possible to realize high-cycle molding.

In control of the servo motor C (41) that drives a rotating action of the reversal pedestal 7, when the positioning pin 44a is inserted, rather than stopping control of a part of position control of the servo motor C (41) and performing the positioning of the reversal pedestal 7 with a servo motor, if the positioning is performed according to mechanical copying of the positioning pin 44a, it is possible to neglect a rotating position dead area of the reversal pedestal 7 due to backlash between the pinion 42 and the large gear 43 and prevent hunting during fine low-speed rotation control. In this case, it is desirable to form the insertion hole of the positioning pin 44a in a slight taper shape that is large on the pin side.

The hydraulic die tightening means is mean for simultaneously tightening the three sets of die plates 2, 9, and 3. The hydraulic die tightening means includes four hydraulic cylinders 2a built in the stationary die plate 2, four tie bars 18 connected to rams 18b of the cylinders 2a and provided to pierce through the movable die plate 3, and four sets of half nuts 17 that are provided on the outer side of the movable die plate 3 and can be engaged with a ring grooves 18a formed at distal ends of the tie bars 18.

The rotary die A (6A) and the rotary die B (6B) attached to both the surfaces of the rotary die plate 9 have the same shape and respectively fit with the movable side die 5 and the stationary side die 4 to form two cavities on both the sides of the rotary die plate 9. Resin materials different from one another are plasticized and injected and filled in these two cavities formed when the stationary die plate 2, the rotary die plate 9, and the movable die plate 3 are simultaneously tightened by the die tightening means from a first injecting unit (a first injecting unit) 11 and a second injecting unit (a second injecting unit) 12.

The first injecting unit 11 is set on the stationary die plate 2 side and used for resin injection to a cavity (a first cavity) formed by the stationary side die 4 and the rotary die A (6A) or the rotary die B (6B).

The second injecting unit 12 is set on the movable die plate 3 side and used for resin injection to a cavity (a second cavity) formed by the movable side die 5 and the rotary die B (6B) or the rotary die A (6A). During operation of the second injecting unit 12, the second injecting unit 12 moves following the opening and closing movement of the movable die plate 3.

As shown in FIG. 1, the second injecting unit 12 can be moved at a large stroke together with the movable die plate 3. However, the second injecting unit 12 is placed on, via a coupling and fixing member 63, a sliding base 64 coupled to and fixed on the movable die plate 3. The sliding base 64 is guided by the guide rail 19 and moves, whereby the second injecting unit 12 can move following the action of the movable die plate 3 without being delayed.

Nozzle touch cylinders 61 and 62 are provided in the first injecting unit 11 and the second injecting unit 12. The nozzle touch cylinders 61 and 62 are provided to couple the first injecting unit 11, the second injecting unit 12, the stationary die plate 2, and the movable die plate 3. The nozzle touch cylinders 61 and 62 are reduced, whereby the first injecting unit 11 and the second injecting unit 12 are pulled to the stationary die plate 2 side and the movable die plate 3 side to press distal end nozzles of the first injecting unit 11 and the second injecting unit 12 against the stationary side die 4 and the movable side die 5 attached to the stationary die plate 2 and the movable die plate 3. The nozzle touch cylinder 62 is slidably provided on the sliding base 64 of the second injecting unit 12.

Figure 5:
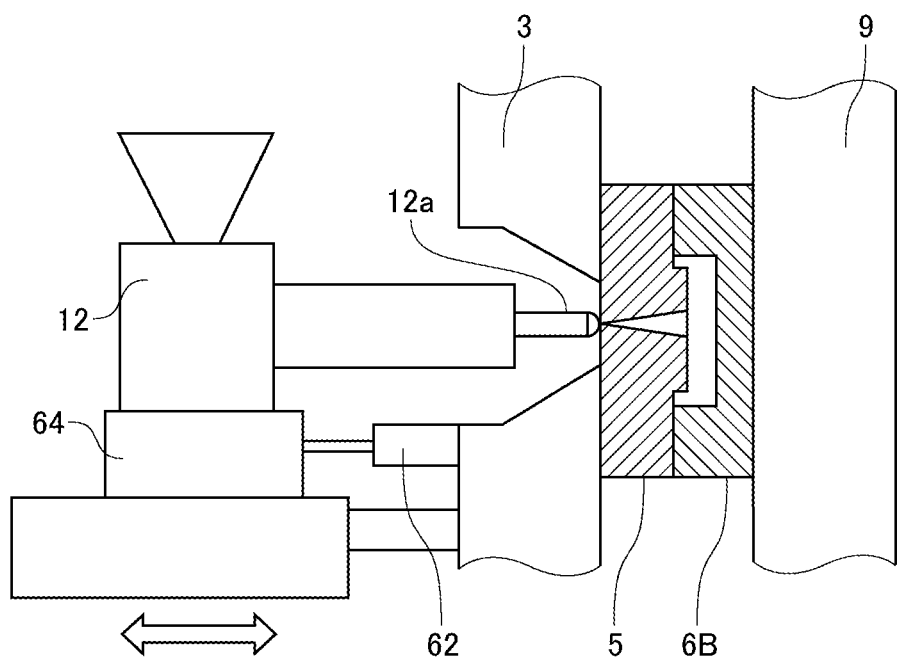
FIG. 5 is an explanatory diagram of a second injecting unit.

As shown in FIG. 5, a nozzle 12a of the second injecting unit 12 is in contact with the movable side die 5. During die opening and closing, the second injecting unit 12 is always in a nozzle touched state. Consequently, it is possible to inject resin from the nozzle 12a simultaneously with completion of die closing and boosting and realize high cycling. During die opening, since the nozzle 12a does not separate from the movable side die 5, it is possible to prevent the resin from dripping from the distal end of the nozzle 12a.

Further, since the second injecting unit 12 can be operated integrally with the movable die plate 3, it is possible to realize a reduction in shock during operation start and during operation stop and prevention of collision of the second injecting unit 12 and the dies due to the shock.

Figure 6:
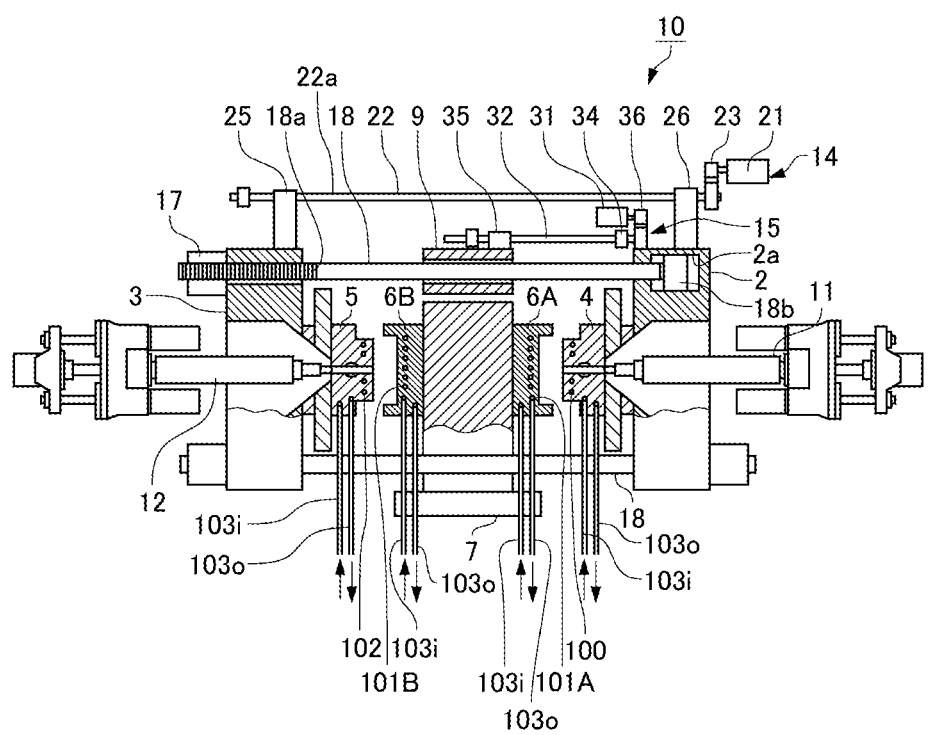
FIG. 6 is a diagram showing a configuration for heating and cooling dies.

As shown in FIG. 6, in the stationary side die 4, the rotary die (6A), the rotary die B (6B), and the movable side die 5, heat medium water passages 100, 101A, 101B, and 102 for heating and cooling die surfaces are formed. In order to transmit heat as quick as possible and rapidly heat and cool die cavity surfaces, the heat medium water passages 100, 101A, 101B, and 102 are formed in positions as close as possible to the die cavities.

A heating medium supply device (a heating device: not shown) that supplies a heating medium and a cooling medium supply device (a cooling device: not shown) that supplies a cooling medium are connected to the heat medium water passages 100, 101A, 101B, and 102. In this embodiment, steam or water is used as the heating medium and the cooling medium. The heating medium supply device (not shown) and the cooling medium supply device (not shown) supply the heating medium and the cooling medium adjusted to a temperature set in advance.

As the heating medium and the cooling medium, the steam and the water are described. However, besides the steam and the water, pressurized hot water, oil, and the like can also be used as the heating medium. Flon, liquid nitrogen, and the like can also be use as the cooling medium.

In order to feed the heating medium and the cooling medium into the heat medium water passages 100, 101A, 101B, and 102 and discharge the heating medium and the cooling medium, heat medium water supply pipes 103i and 103o are respectively connected to the heat medium water passages 100, 101A, 101B, and 102.

As shown in FIG. 6, one ends of the heat medium water supply pipes 103i and 103o can also be directly connected to the stationary side die 4, the rotary die A (6A), the rotary die B (6B), and the movable side die 5. In that case, the heat medium water supply pipes 103i and 103o connected to the heat medium water passages 101A and 101B of the rotary die A (6A) and the rotary die B (6B) are held on the reversal pedestal 7 in a stationary state.

Figure 7:
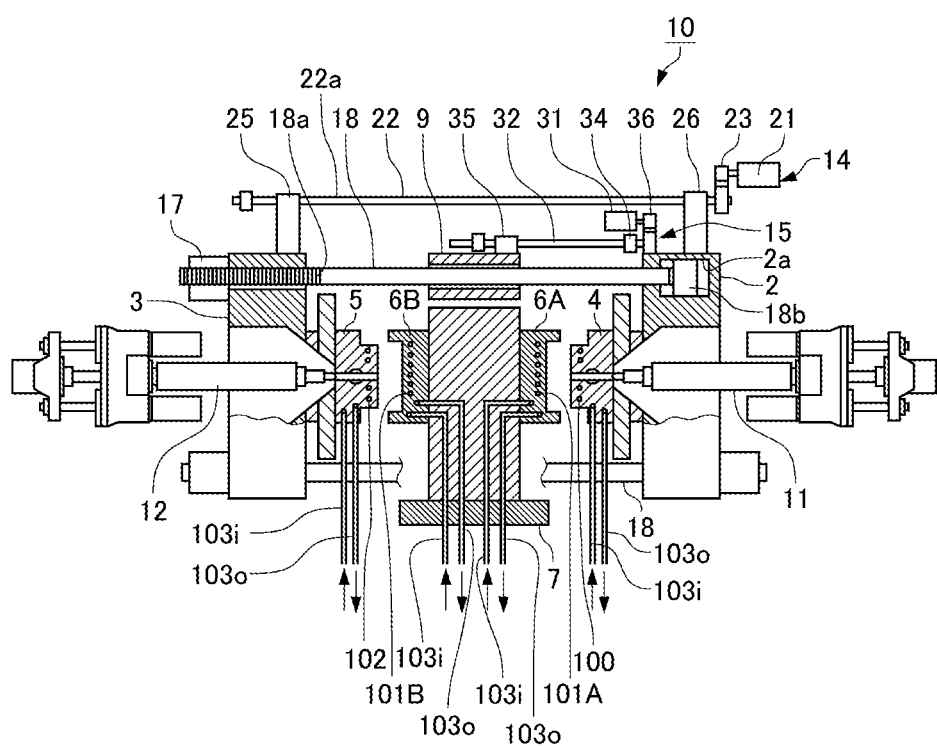
FIG. 7 is a diagram showing another example of the configuration for heating and cooling dies.

As shown in FIG. 7, the heat medium water supply pipes 103i and 103o can also be integrally formed on the rotary die plate 9 in that case, the ends of the heat medium water supply pipes 103i and 103o formed in the rotary die plate 9 are directly connected to the heat medium water passages 101A and 101B of the rotary die A (6A) and the rotary die B (6B).

In FIG. 7, an example in which the ends of the heat medium water supply pipes 103i and 103o are directly connected to the heat medium water passages 101A and 101B of the rotary die A (6A) and the rotary die B (6B) is shown. However, the ends of the heat medium water supply pipes 103i and 103o may be coupled to the heat medium water passages 101A and 101B of the rotary die A (6A) and the rotary die B (6B) via flexible pipes or the like having flexibility.

In both the configurations shown in FIGS. 6 and 7, in order to allow the rotation of the rotary die plate 9, the heat medium water supply pipes 103i and 103o are connected to the flexible pipes or the like having flexibility under the rotary die plate 9.

However, although the heat medium supply pipes 103i and 103o are shown under the rotary die plate 9, the heat medium water supply pipes 103i and 103o may be connected to the flexible pipes or the like having flexibility above the rotary die plate 9.

The heating medium supply device (not shown) feeds the heating medium into the heat medium water passages 100, 101A, 101B, and 102 with a pump (not shown), heats the stationary side die 4, the rotary die A (6A), the rotary die B (6B), and the movable side die 5, and circulates the heating medium fed through the heat medium water passages 100, 101A, 101B, and 102. The cooling medium supply device (not shown) feeds the cooling medium into the heat medium water passages 100, 101A, 101B, and 102 with a pump (not shown), cools the stationary side die 4, the rotary die A (6A), the rotary die B (6B), and the movable side die 5, and circulates the cooling medium fed through the heat medium water passages 100, 101A, 101B, and 102. The heating medium supply device (not shown) and the cooling medium supply device (not shown) open and close not-shown opening and closing valves to control the supply of the heating medium and the cooling medium. The opening and closing of the opening and closing valves (not shown) is controlled by a control device (a control unit) of the injection molding machine for two-material molding 10 on the basis of a program set in advance.

Die temperature sensors (not shown) are arranged near cavity surfaces of the stationary side die 4, the rotary die A (6A), the rotary die B (6B), and the movable side die 5. Signals of temperatures detected by the die temperature sensors (not shown) are sent to the control device of the injection molding machine for two-material molding 10. The control device of the injection molding machine for two-material molding 10 performs control on the basis of a computer program set in advance, opens and closes the opening and closing valves (not shown) according to the temperatures detected by the die temperature sensors (not shown), and controls the supply of the heating medium and the cooling medium to the heat medium water passages 100, 101A, 101B, and 102.

A process of two-material injection molding of the injection molding machine for two-material molding 10 is explained with reference to FIG. 8. In the two-material injection molding, the injection molding machine for two-material molding 10 sequentially performs a primary injection molding process for performing injection molding in a cavity on the second injecting unit 12 side and a secondary injection molding process for performing injection molding in a cavity on the first injecting unit 11 side.

(Primary Injection Molding Process)

Figure 8A:
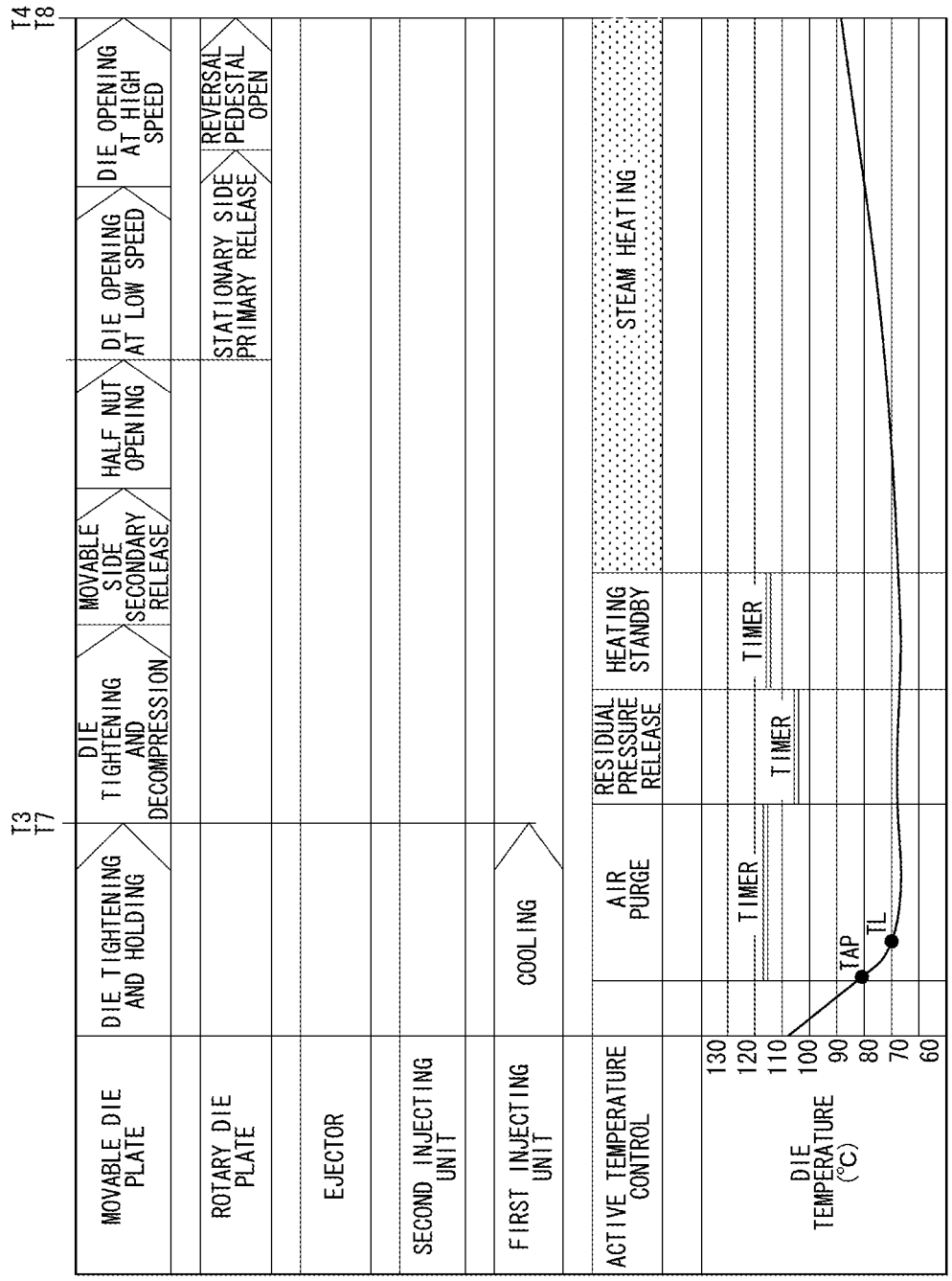
FIG. 8 (FIGS. 8A, 8B and 8C) is a diagram showing examples of an injection molding operation and die temperature control according to the embodiment.
Figure 8B:
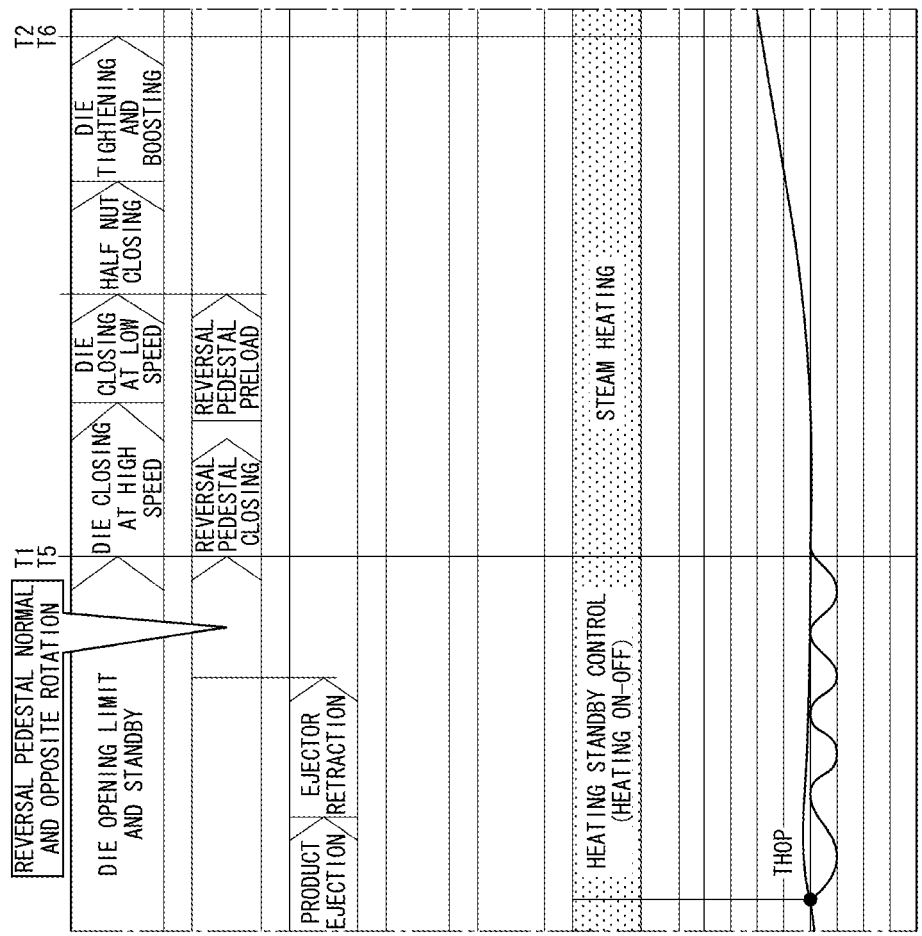
Figure 8C:
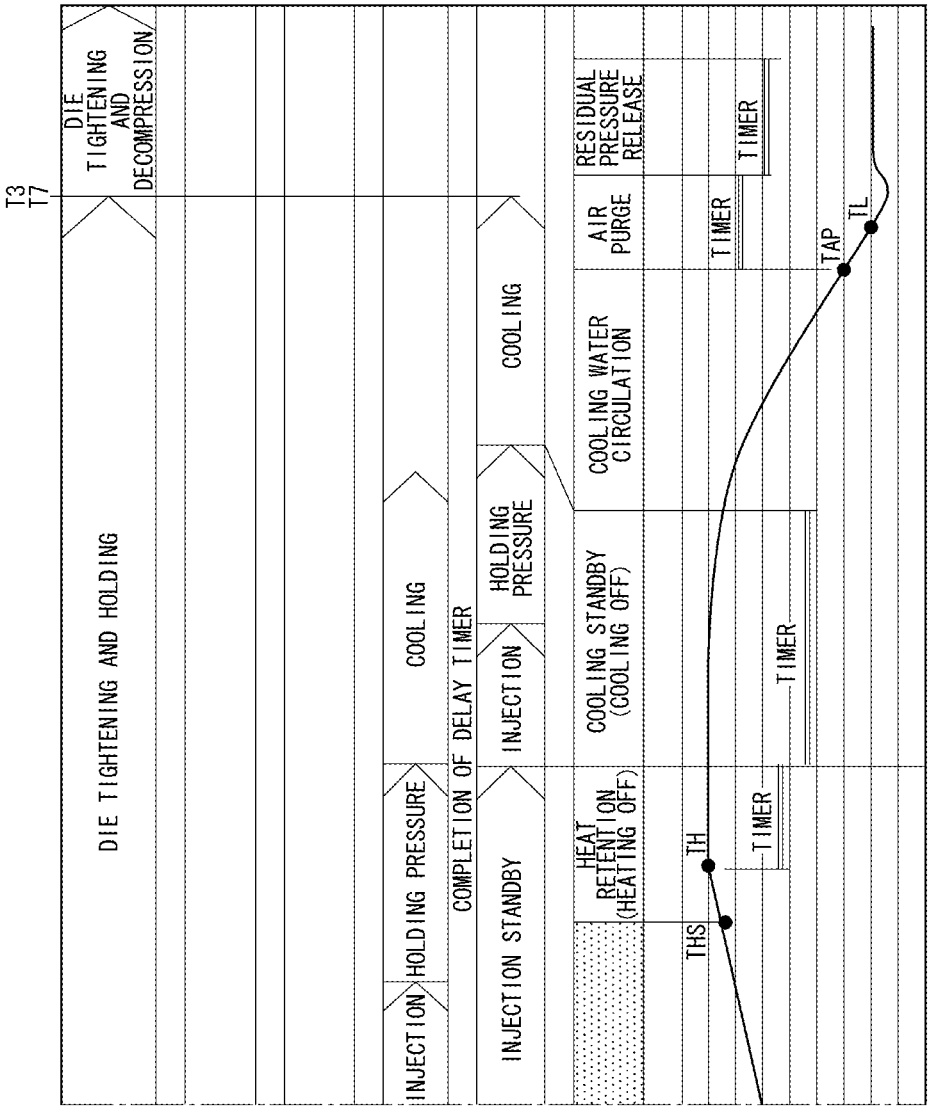

As shown in FIG. 8, at timing T1, after first die closing for bringing the rotary die plate 9 and the movable die plate 3 close to the stationary die plate 2 and closing the dies, die tightening by the hydraulic cylinder 2a is performed. At timing T2 after completion of the die tightening, molten resin A is injected and filled in a cavity formed by the rotary die A (6A) or the rotary die B (6B) and the movable side die 5 from the second injecting unit 12. After completion of the injection and filling, the state is kept for a fixed time to cool the dies.

(Die Rotating Process)

At timing T3 after the elapse of time in which the resin A solidifies, the movable die plate 3 and the reversal pedestal 7 loaded with the rotary die plate 9 are opened and moved and spaces among the die plates 2, 9, and 3 are sufficiently opened. After the rotary die plate 9 is rotated 180 degrees at timing T4, at timing T5, the movable die plate 3 and the rotary die plate 9 are closed again.

(Secondary Injection Molding Process)

In this secondary injection molding process after the re-die closing, at timing T6 (=T2) after die tightening by the hydraulic cylinder 2a, molten resin B is injected and filled in a cavity formed by a molded product stuck to the rotary die A (6A) or the rotary die B (6B) and the stationary side die 4 from the first injecting unit 11. Consequently, a two-material molded product in which two materials are laid one on top of the other is molded.

At the same time, on the second injecting unit 12 side, as the next primary injection molding process, in the same manner as explained above, the molten resin A is injected and filled in the cavity formed by the rotary die B (6B) or the rotary die A (6A) and the movable side die 5 from the second injecting unit 12.

After completion of the injection and filling from the first injecting unit 11 and the second injecting unit 12, the state is kept for a fixed time to cool the dies. At timing T7 after the elapse of time in which both the resin A and the resin B solidify, the movable die plate 3 and the reversal pedestal 7 are opened and moved and the spaces among the die plates 2, 9, and 3 are sufficiently opened. At timing T8, a two-material molded product stuck to the rotary die A (6A) or the rotary die B (6B) on the first injecting unit 11 side is ejected to the outside of the machine by a not-shown ejector.

Thereafter, the 180-degree rotation of the rotary die plate 9, the closing of the movable die plate 3, the rotary die plate 9, and the stationary die plate 2, the injection and filling, the cooling, and the die opening on the first injecting unit 11 side and the second injecting unit 12 side, and the ejection of the two-material molded product from the first injecting unit 11 side are sequentially repeated. Consequently, the two-material molded product can be continuously produced.

As shown in FIG. 8, in this embodiment, the injecting and filling operation of the first injecting unit 11 and the injecting and filling operation of the second injecting unit 12 are performed with a time difference set by a delay timer. This is for the purpose of performing die heating in performing injection molding on the first injecting unit 11 side on a secondary side explained later. If a sufficient heating time can be secured, naturally, it is also possible to simultaneously perform the injecting and filling operation of the first injecting unit 11 and the injecting and filling operation of the second injecting unit 12.

During the series of two-material injection molding cycle, the control device of the injection molding machine for two-material molding 10 executes processing set on the basis of a computer program introduced in advance to perform control of die temperature explained below.

A temperature change during the series of injection molding cycle is shown in FIG. 8. Since the control device of the injection molding machine for two-material molding 10 controls the temperatures (die temperatures) of the stationary side die 4, the rotary die A (6A), the rotary die B (6B), and the movable side die 5, the change in the die temperatures is shown in FIG. 8. However, cavity temperatures are substantially equivalent.

In this embodiment, after the primary injection molding process, after die opening at timing T4 is started and before die closing and die tightening are performed at timing T5, the heating medium heated by the heating medium supply device (not shown) is fed into the heat medium water passages 100, 101A, 101B, and 102 and the heating of the stationary side die 4, the rotary die A (6A), the rotary die B (6B), and the movable side die 5 is started. The heating is performed in at least one of the stationary side die 4, the rotary die A (6A), the rotary die B (6B), and the movable side die 5. It only has to be determined beforehand according to molding conditions or the like in which of the stationary side die 4, the rotary die A (6A), the rotary die B (6B), and the movable side die 5. In this way, the stationary side die 4, the rotary die A (6A), the rotary die B (6B), and the movable side die 5 can be heated and cooled independently or in combination according to the molding conditions or the like. Therefore, the heating and cooling control can be performed independently for each of the stationary side die 4, the rotary die A (6A), the rotary die B (6B), and the movable side die 5.

At timing T4 and subsequent timing, while the series of processes of the die opening, the ejection of the two-material molded product from the first injecting unit 11 side, and the 180-degree rotation of the rotary die plate 9 are performed, when the temperatures of the stationary side die 4, the rotary die A (6A), the rotary die B (6B), and the movable side die 5 reach target temperature THOP, the heating medium supply device maintains the temperatures within a temperature range set higher than die temperature during heating start and lower than die temperature during injection (heating standby control). At this point, such that the die temperature is maintained within a temperature range set in advance, after the temperatures of the stationary side die 4, the rotary die A (6A), the rotary die B (6B), and the movable side die 5 reach target temperature THOP, the heating medium supply device turns on and off the feeding of the heating medium on the basis of temperatures detected by the die temperature sensors (not shown) to switch on and off of the heating.

When a temperature difference occurs because of heating between dies opposed to and fitting with each other among the stationary side die 4, the rotary die A (6A), the rotary die B (6B), and the movable side die 5, the target temperature THOP is set to a temperature at which a difference in a thermal expansion amount due to the temperature difference is smaller than a fitting clearance.

When the 180-degree rotation of the rotary die plate 9 is completed and boosting for the die closing and the die tightening is started at timing T5, the heating medium supply device (not shown) feeds the heating medium into the heat medium water passages 100, 101A, 101B, and 102 and resumes the heating of the stationary side die 4, the rotary die A (6A), the rotary die B (6B), and the movable side die 5.

When the temperatures of the stationary side die 4 and the rotary die A (6A) or the rotary die B (6B) reach target temperature THS set in advance, the heating medium supply device (not shown) stops feeding of the heating medium, turns off the heating, and keeps heat. However, because of a propagation delay of thermal energy, the die temperatures rise to a temperature TH after the stop of the feeding of the heating medium. Therefore, the target temperature THS is appropriately set taking into account the temperature TH.

When a fixed time set in advance elapses after the temperatures of the stationary side die 4 and the rotary die A (6A) or the rotary die B (6B) reach the target temperature TH set in advance, an injecting operation on the second injecting unit 12 side is started.

After completion of the injection on the second injecting unit 12 side, the cooling medium supply device (not shown) feeds the cooling medium into the heat medium water passages 100, 101A, 101B, and 102 and starts cooling of the stationary side die 4, the rotary die A (6A), the rotary die B (6B), and the movable side die 5. When the temperatures of the stationary side die 4, the rotary die A (6A), the rotary die B (6B), and the movable side die 5 reach cooling target temperature TAP, the cooling medium supply device (not shown) stops the feeding of the cooling medium. However, because of a propagation delay of thermal energy, the die temperatures falls to a temperature TL after the stop of the feeding of the cooling medium. Therefore, the cooling target temperature TAP is appropriately set taking into account the temperature TL.

In this way, prior to performing the injection molding on the second injecting unit 12 side, after the injection molding on the first injecting unit 11 side, heating of the dies is started before the 180-degree rotation of the rotary die plate 9 is completed. Consequently, after the die closing, in a manner of speaking, heating only has to be performed from intermediate temperature. Therefore, compared with starting die heating only after the die closing without performing heating beforehand, it is possible to substantially reduce time required for the die heating.

Since the heating after the die closing is the heating from the intermediate temperature, it is unnecessary to excessively rapidly perform the heating in order to perform the heating in a short time. Overshoot can be suppressed and temperature control can be reliably performed. Therefore, in particular, this is effective in performing molding of transparent resin. It is possible to suppress the transparent resin from discoloring because of thermal deterioration due to overshoot.

After the start of the heating, until the 180-degree rotation of the rotary die plate 9 is completed, i.e., the die closing is performed, the die temperatures are maintained within a temperature range set higher than the die temperatures during the heating start and lower than the die temperatures during the injection. Consequently, since the die temperatures can be uniformalized, it is possible to prevent the stationary side die 4 and the rotary die A (6A) or the rotary die B (6B) from interfering with each other because of, for example, excessively high die temperatures during the die closing and a difference in an expansion amount due to fluctuation in a boosting degree.

In this way, it is possible to prevent the dies from interfering with each other when the dies are closed and prevent overshoot of cavity temperatures while efficiently performing the heating of the dies.

When the series of operations is performed, since the die plates attached with the dies are heavy, selection of moving speed and acceleration has to be carefully performed.

For example, as dies for molding a molded product (a two-material molded product having dimensions of 1550 mm×1200 mm), the weight of rotary dies is as large as 18 tons (9 tons/one die×2). The weight of the rotary die plate 9 for rotating the dies is as large as 20 tons. Therefore, when high moving speed is selected, necessary acceleration power increases or acceleration takes time and a large load is applied to driving means. Sudden acceleration and deceleration cause vibration.

Hydraulic driving means is suitable for large driving force. However, when this means moves a heavy object, it is difficult and takes time to accurately control a position. Recently, the capacity of a ball screw, which is precision driving means, has increased, this ball screw device is used in moving means for a considerably heavy object as well. Since the ball screw device driven by a servo motor controls the number of revolutions of the servo motor with a program, it is easy to control moving speed and a stop position of a driven object.

The servo motor and the ball screw driving means may be used for moving means for the movable die plate 3 and the rotary die plate 9 of the injection molding machine for two-material molding 10. In a not-shown control device, acceleration (deceleration) may be programmed in a smoothly-actuating acceleration profile (e.g., Sin curve). A program for speed and position control may be created such that a setting input can be adjustably performed to move the reversal pedestal 7 loaded with the movable die plate 3 and the rotary die plate 9 at speed for minimizing a die opening and closing movement time of the reversal pedestal 7. The servo motor may be controlled according to the program. Since the servo motor is used, it is possible to realize an operation at high accuracy.

Further, as controls of electric motor operations, a control amount may be calculated by a control expression including an inertial term that takes into account the weight of opening and closing means for the respective die plates or the weight of rotating means for the rotary die plate 9 and a sufficient control amount may be given to inertia of a heavy object. Consequently, control accuracy is improved. A control device that executes feedback control for enabling stable control in a short time may be provided to perform the feedback control.

Consequently, it is possible to increase the speed of a cycle in two-material molding and realize a highly-accurate operation.

In speed control in the feedback control, in speed control during acceleration or during deceleration, acceleration or deceleration is performed at fixed acceleration according to a linear line. In speed control during switching from acceleration control to constant speed control or during switching from the constant speed control to deceleration control, speed control is performed according to a quadratic curve, tangential lines of which are respectively linear line speeds of acceleration and constant speed or the constant speed and deceleration, thereby realizing a smooth control.

Consequently, a shock during speed switching is relaxed and excessive current prevention for an electric motor can be performed. It is possible to prevent damage to operating members due to the shock and extend the life of the members.

As a rotation speed control method for the rotary die plate 9, when the rotary die plate 9 on the reversal pedestal 7 is rotated 180 degrees, to minimize a rotation time, a not-shown control device creates a program for rotation speed control such that a setting input can be performed to be capable of adjusting rotation acceleration and rotation speed and controls the servo motor.

Figure 9:
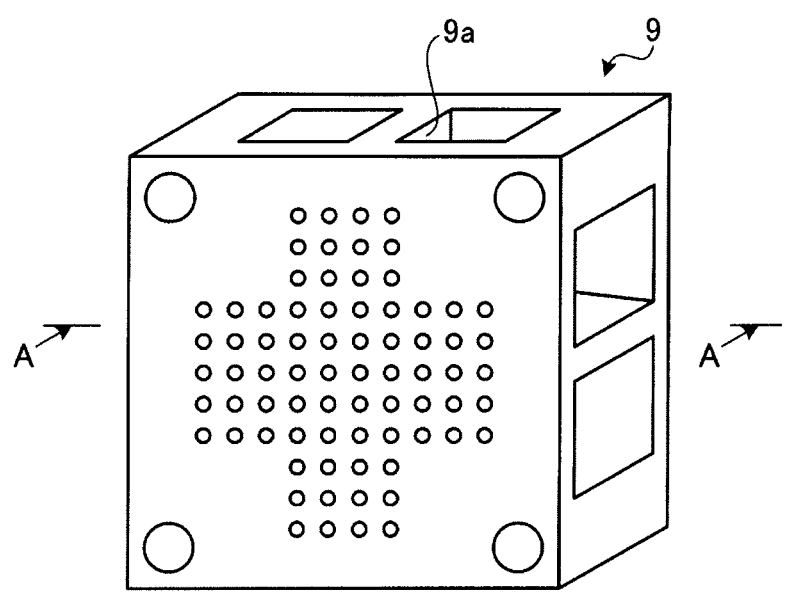
FIG. 9 is a perspective view of the rotary die plate.
Figure 10:
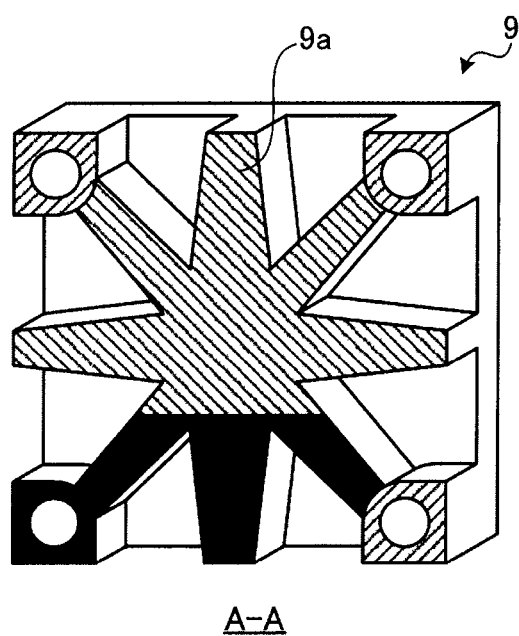
FIG. 10 is an A-A sectional view of the rotary die plate shown in FIG. 9.

The thickness of a reinforcing rib 9a of the rotary die plate 9 may be set to gradually decrease from the center to the outer side of the rotary die plate as shown in FIGS. 9 and 10 to reduce the weight of the rotary die plate 9.

Consequently, it is possible to realize a reduction in rotation inertia associated with the reduction of the weight from the rotation center to the remote side. As a result, it is possible to realize control with energy saving, high responsiveness, and high accuracy.

A driving device for intra-die movable member actions such as a molded product ejecting action in a die, a movable telescopic action, and a gate valve action may be provided in the rotary die plate 9 to perform release of a molded product.

Consequently, it is possible to make it unnecessary to provide a molded product ejecting device for ejecting a molded product on the die side and simplify the structure of the dies. As a result, since the driving device for the intra-die movable member actions can be shared for different dies, it is possible to realize a reduction in cost of manufacturing of dies different for each of molded product and necessary for each of the molded product.

In this case, in operation control of the molded product ejecting device, a communication device that can transmit and receive control signals by radio may be provided to realize a reduction in weight through simplification of wiring and a reduction in wiring members.

Consequently, it is unnecessary to form a communication wire in sliding specifications for the case of wired communication and writing can be simplified. As a result, it is possible to reduce the weight of the rotary die plate.

In a method of preventing collision of the die plates, a distance necessary for the reversal pedestal 7 mounted with the movable die plate 3 or the rotary die plate 9 to stop is set as a collision prevention distance e (not described in the figure), respective positions of the stationary die plate 2, the movable die plate 3, and the rotary die plate 9 are monitored, and, when relative positions of the die plates enter the collision prevention distance e, an approaching one of the die plates is automatically decelerated or stopped to prevent collision during opening and closing movement of the movable die plate 3 and the rotary die plate 9.

Figure 11:
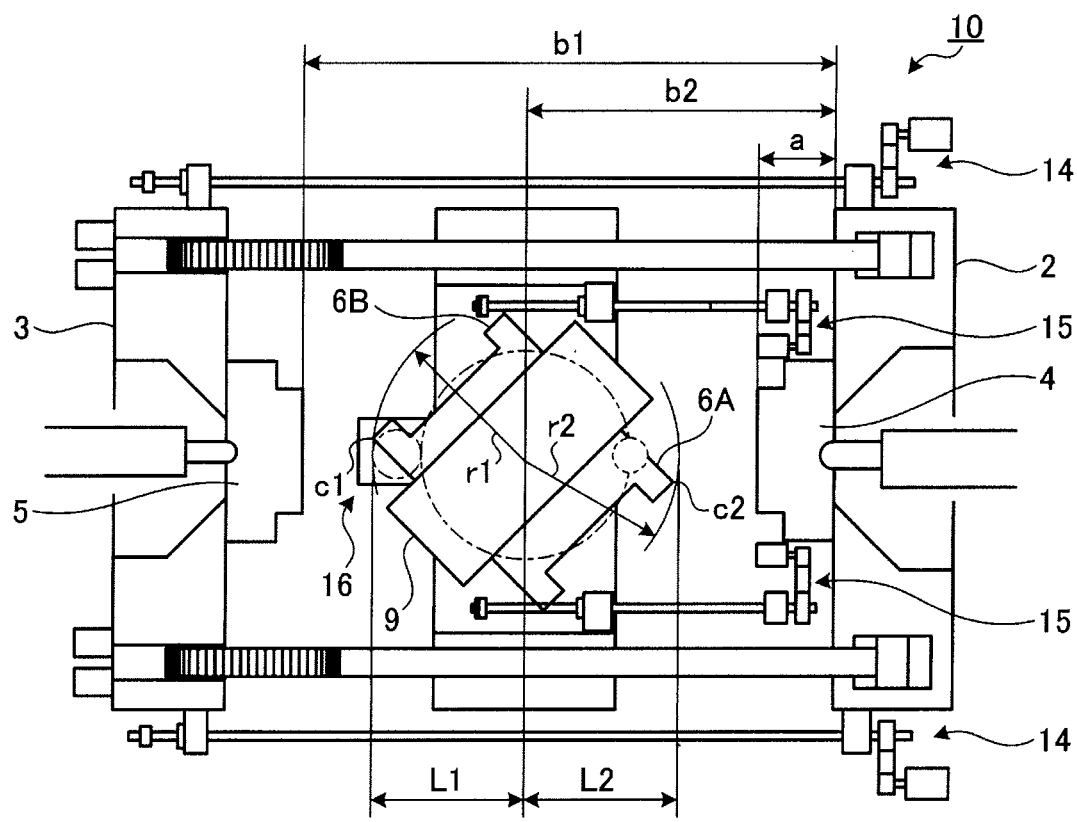
FIG. 11 is a diagram for explaining a collision preventing method during die plate opening and closing of the injection molding machine for two-material molding according to the first embodiment of the present invention.

An example of the behavior of and collision prevention control for the movable die plate 3 and the rotary die plate 9 during the movement of the movable die plate 3 and the rotary die plate 9 and during the rotation of the rotary die plate 9 is explained. In FIG. 11, an angle of the rotary die plate 9 or an angle of the rotary die A (6A) that draws a rotation track at a distance r2 most distant to the stationary die plate 2 side from the rotation axis of the rotary die plate 9 in a direction perpendicular to the rotation axis is represented as c2, an angle of the rotary die plate 9 or an angle of the rotary die B (6B) that draws a rotation track at a distance r1 most distant to the movable die plate 3 side from the rotation axis in the direction perpendicular to the rotation axis is represented as c1, a distance from the rotation axis of the rotary die plate 9 to c2 is represented as L2, and a distance from the rotation axis of the rotary die plate 9 to c1 is represented as L1.

FIG. 11 shows the case of the angle c2 of the rotary die A (6A) and the angle c1 of the rotary die B (6B). L1 and L2 are a fluctuating number unconditionally calculated from a rotation angle of the rotary die plate 9 and values of r1 and r2.

If the rotary die A (6A) and the rotary die B (6B) have the same shape, L1=L2.

The thickness of the stationary side die 4 is represented as a, a distance from a die attaching surface of the stationary die plate 2 to the rotation axis of the rotary die plate 9 is represented as b2, and a distance from the die attaching surface of the stationary die plate 2 to an end face of the movable side die 5 is represented as b1. b1 and b2 are fluctuating numbers.

In the injection molding machine for two-material molding 10 according to this embodiment, when the rotary die A (6A) closes and moves to the stationary side die 4 during rotation, if b2−a−L2=e, control for decelerating or stopping the rotary die plate 9 is performed.

When the movable side die 5 closes and moves to the rotary die B (6B) in rotation, if b1−b2−L1=e, the movable die plate 3 is decelerated or stopped.

When the rotary die A (6A) moves in a direction away from the stationary side die 4 and when the movable side die 5 opens and moves in a direction away from the rotary die B (6B), first, the movable die plate 3 opens and moves and, from a point when a space between the movable side die 5 and the rotary die B (6B) exceeds e, the rotary die plate (9) is opened and moved or caused to start a rotating action.

In the die plate speed control method explained above, when the opening and closing movement of the movable die plate 3 and the rotary die plate 9 and the rotation of the rotary die plate 9 are performed in parallel, a distance between the rotary die plate 9 and the stationary die plate 2 and a distance between the rotary die plate 9 and the movable die plate 3 during the rotation of the rotary die plate 9 may be calculated from the position of the movable die plate and the position and the rotation angle of the rotary die plate and, when the distances enter the collision prevention distance e, an approaching one of the die plates may be automatically decelerated or stopped to prevent collision during the opening and closing movement of the movable die plate 3 and the rotary die plate 9 and the rotation of the rotary die plate 9.

By checking relative spaces between the die plates while performing operation in a real machine, it is possible to cut the space and further reduce moving time of the die plates.

Second Embodiment

Figure 12:
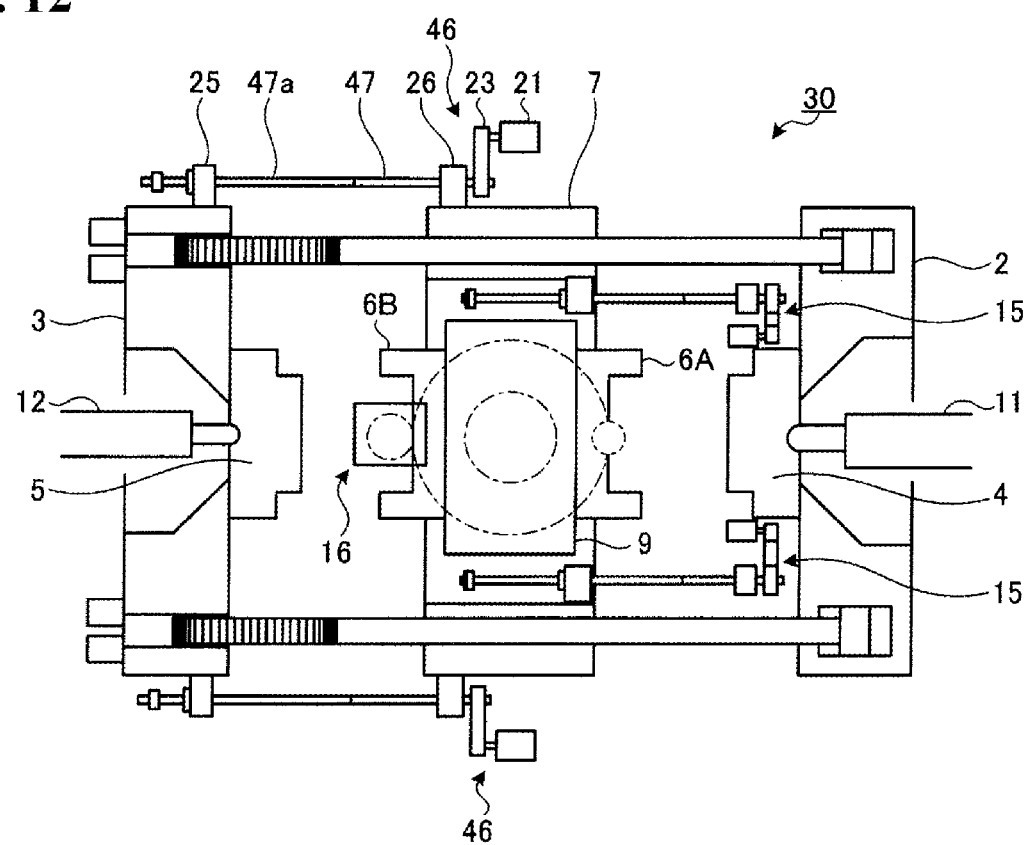
FIG. 12 is a plan schematic view of an injection molding machine for two-material molding according to a second embodiment of the present invention.

The second embodiment of the present invention is explained. The second embodiment is different from the first embodiment in that, as shown in a plan schematic view of an injection molding machine for two-material molding 30 shown in FIG. 12, the servo motors A (21) of movable die plate opening and closing means 46 for driving the movable die plate 3 and the supporting tables 26 of ball screw shafts 47 are set on the reversal pedestal 7. Otherwise, the second embodiment is the same as the first embodiment. Therefore, explanation of the other components is omitted.

As an advantage of the second embodiment, since the ball screw shafts 47 can be reduced in length, critical speed of the ball screw shafts 47 is improved and opening and closing speed of the movable die plate 3 can be increased. Since the rotary die plate 9 and the movable die plate 3 are directly coupled by a ball screw, when a relative distance between the rotary die plate 9 and the movable plate 3 during die opening and closing or the like is detected and controlled, calculation of the relative position between the rotary die plate 9 and the movable die plate 3 is unnecessary and the control can be easily performed.

Third Embodiment

Figure 13:
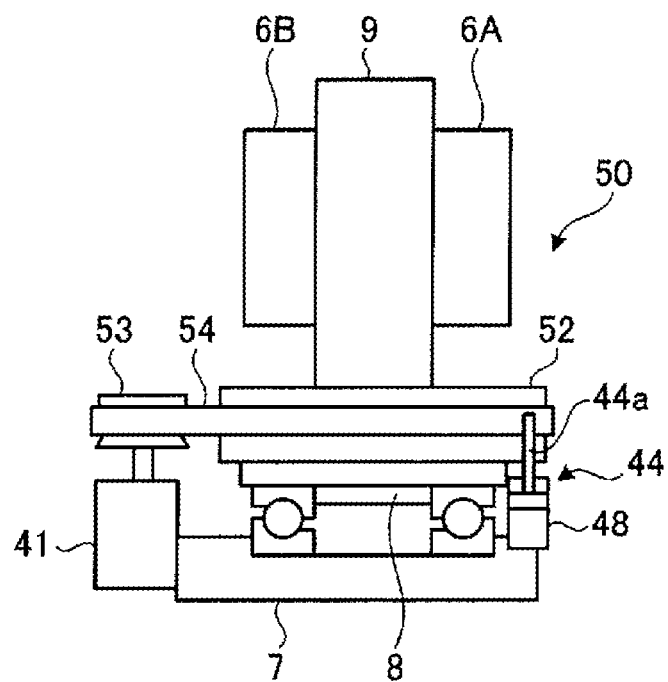
FIG. 13 is a side view showing a schematic configuration of a rotary die plate according to a third embodiment of the present invention.

A third embodiment of the present invention is explained. The third embodiment is different from the first embodiment in that, as shown in a schematic side view of the rotary die plate 9 of FIG. 13, rotary die plate rotating means 50 is rotation driving means including a servo motor C (41) attached to the reversal pedestal 7, a pinion 53 attached to the servo motor C (51), a large gear 52 that meshes with the pinion 53 and is integrally provided in the rotary die plate 9, and an endless toothed belt 54 wound around the pinion 53 and the large gear 52. The rotary die plate rotating means 50 half-rotates the rotary die plate 9 in normal and opposite directions. Otherwise, the third embodiment is the same as the first embodiment. Therefore, explanation of the other components is omitted.

According to this embodiment, it is unnecessary to set the large gear 52 and the pinion 53 in direct contact with each other. A distance between the rotation axis of the large gear 52 and the rotation axis of the pinion 53 can be arbitrarily set. Therefore, there is an advantage that, when the pinion 53 cannot be set nearest the large gear 52 or when necessity for changing a reduction ratio occurs, it is possible to select a gear shape without being restricted by an inter-axis direction.

Instead of the pinion 53, the large gear 52, and the endless toothed belt 54, a small-diameter chain sprocket may be wound around an output shaft of the servo motor C (41), a large-diameter chain sprocket may be integrated with the rotary die plate 9, and an endless chain may be wound around both the chain sprockets.

Fourth Embodiment

Figure 14:
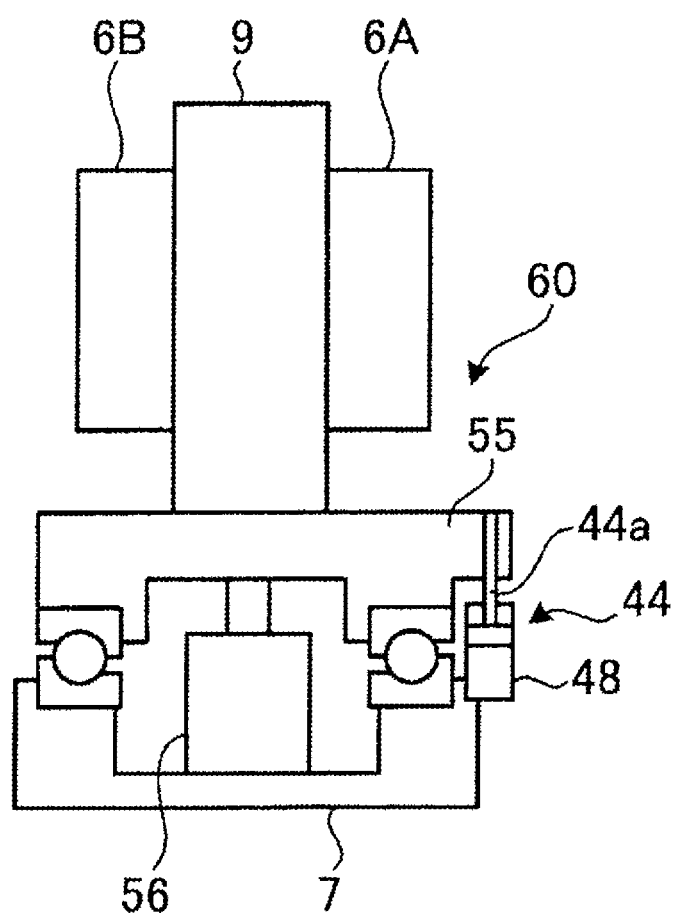
FIG. 14 is a side view showing a schematic configuration of a rotary die plate according to a fourth embodiment of the present invention.

A fourth embodiment of the present invention is explained. The fourth embodiment is different from the first and second embodiments in that, as shown in a schematic side view of the rotary die plate 9 in FIG. 14, rotary die plate rotating means 60 is a direct drive type in which a gear, an endless belt, and the like for power transmission are not used and a servo motor D (an electric motor) (56) attached to the reversal pedestal 7 is directly connected to a rotating shaft 57 of a table 55 integral with the rotary die plate 9. Otherwise, the fourth embodiment is the same as the first embodiment. Therefore, explanation of the other components is omitted.

In the direct drive system by the servo motor D (56), a gear and a belt are not interposed. Therefore, there is an advantage that the rotary die plate 9 rotates as instructed by a program and a backlash does not occur in an operation.

In each of the embodiments above, the heating and the cooling of the dies are performed. However, the heating and the cooling of the dies can be performed in any one of the first injecting unit 11 side and the second injecting unit 12 side or in both the first injecting unit 11 side and the second injecting unit 12 side.

In at least one of the injection molding processes on the first injecting unit 11 side and the second injecting unit 12 side, for example, injection compression molding, foam molding, gas assist molding, and insert molding can also be performed.

In particular, when the injection compression molding is performed, after injection and filling are performed in a state in which the dies are open by a very small dimension (slightly open), the dies are closed and compression molding is performed. However, it is possible to highly accurately control the slight opening dimension by electrically performing the die opening and closing as explained above. In the case of the injection molding machine for two-material molding 10 explained in this application, since the dies and the die plates are arranged in series, fluctuations (errors) in distances among the die plates tend to accumulate and increase. However, it is possible to improve die opening and closing accuracy by electrically performing the die opening and closing. In this way, it is possible to improve thickness accuracy of a molded product.

In heating and cooling molding, heating and cooling are alternately repeated in one shot. However, since expansion amounts of the dies due to heating tend to fluctuate, in some case, fluctuation also occurs in a slight opening amount in the injection compression molding. In actual molding, a position set as a reference of the slight opening amount needs to be reviewed such that a molded product having stable thickness can be molded even if fluctuation in the slight opening amount in the injection compression molding occurs. However, such a reference position is often a pinpoint condition with narrow tolerance. On the other hand, the electrical die opening and closing can be controlled with high reproducibility even under the pinpoint condition, it is possible to easily mold a molded product having stable thickness.

In the embodiments, in the injection molding machine, the stationary die plate 2 is fixed at one end of the base 1 of the injection molding machine. The injection molding machine performs the die opening and closing action when the reversal pedestal 7 and the movable die plate 3 move in the direction in which the reversal pedestal 7 and the movable die plate 3 approach and separate from the stationary die plate 2. The injection molding machine includes the die tightening device that tightens the stationary die plate 2, the movable die plate 3, and the rotary die plate 9. Instead, the injection molding machine can be an injection molding machine in which the reversal pedestal 7 arranged between the first die plate and the second die plate is fixed to the base 1 of the injection molding machine in a direction in which the first die plate and the second die plate approach and separate from each other. The injection molding machine performs the die opening and closing action when the first and second movable die plates move to the reversal pedestal 7. In this case, only a structure for fixing the reversal pedestal 7, the first die plate, and the second die plate to the base 1 of the injection molding machine is changed. The other components and actions and effects are not different from the configuration explained in the embodiments at all.

The die tightening device can be a die tightening device that tightens opposed ones of the stationary die plate 2, the movable die plate 3, and the rotary die plate 9. In that case, only the die tightening member is changed. The other components and actions and effects are not different at all.

The heating device includes the heating medium supply device that uses the heating medium. However, an electric or electromagnetic heating device can also be used as the heating device. In this case, only the heating device and the control of the heating device are changed. The other components and actions and effects are not different from the configuration explained in the embodiments at all. The present invention is not limited by the embodiments. The components in the embodiments below include components that can be easily assumed by those skilled in the art or components substantially the same as the components.

REFERENCE SIGNS LIST 2 stationary die plate (first die plate)
3 movable die plate (second die plate)
4 stationary side die (first die)
5 movable side die (second die)
6A rotary die A
6B rotary die B
7 reversal pedestal
9 rotary die plate
10, 30 injection molding machine for two-material molding
11 first injecting unit (first injecting unit)
12 second injecting unit (second injecting unit)
14, 46 movable die plate opening and closing means (first die opening and closing means)
15 rotary die plate opening and closing means (second die opening and closing means)
16, 50, 60 rotary die plate rotating means
17 half nuts
18 tie bars
21 servo motors A (electric motors)
22a, 32a, 47a ball screws
24, 33 ball screw nuts
31 servo motors B (electric motors)
41 servo motor C (electric motor)
56 servo motor D (electric motor)
100, 101A, 101B, and 102 heat medium water passages

The invention claimed is:

1. An injection molding machine for two-material molding comprising:
a first die plate attached with a first die;
a second die plate attached with a second die and opposed to the first die plate;
a reversal pedestal provided between the second die plate and the first die plate;
a rotary die plate provided on the reversal pedestal to be rotatable 180 degrees, on both surfaces of the rotary die plate being respectively attached with rotary dies alternately opposed to the second die and the first die;
first die opening and closing means for enabling the first die plate and the second die plate to relatively open and close in a direction in which the first die plate and the second die plate approach and separate from each other;

second die opening and closing means for enabling the first die plate and the rotary die plate to relatively open and close in the same direction as the direction of the second die plate;

die tightening means for tightening the first die plate, the second die plate, and the rotary die plate;

a first injecting unit that plasticizes a resin material and injects and fills the resin material in a first cavity formed between the first die and the rotary die opposed to the first die;

a second injecting unit that plasticizes a resin material and injects and fills the resin material in a second cavity formed between the second die and the rotary die opposed to the second die;

a heating device that heats at least one of the first die, the second die, and the rotary dies;

a cooling device that cools at least one of the first die, the second die, and the rotary dies; and a control unit that controls the heating device and the cooling device, wherein after completion of injection molding in the first injecting unit or the second injecting unit, prior to rotating the reversal pedestal 180 degrees in order to inject and fill the resin material in the first injecting unit or the second injecting unit, the control unit issues a heating start command to the heating device, starts heating of the first cavity and/or the second cavity, maintains, before completion of the rotation of the reversal pedestal, temperatures of the dies within a temperature range higher than a die temperature during heating start and lower than the die temperature during injection, and, after the completion of the rotation of the reversal pedestal, resumes the heating of the first cavity and/or the second cavity.

2. The injection molding machine for two-material molding according to claim 1,
wherein
the first die plate is a stationary die plate fixed to a base of the injection molding machine for two-material molding,
the second die plate is a movable die plate made movable in a direction in which the movable die plate approaches and separates from the stationary die plate,
the first die opening and closing means opens and closes the movable die plate with respect to the stationary die plate to enable the stationary die plate and the movable die plate to relatively open and close in a direction in which the stationary die plate and the movable die plate approach and separate from each other, and
the second die opening and closing means opens and closes the rotary die plate with respect to the stationary die plate to enable the stationary die plate and the rotary die plate to relatively open and close in the same direction as the direction of the movable plate.

3. The injection molding machine for two-material molding according to claim 1,
wherein
each of the first die plate and the second die plate is made movable, with respect to the base of the injection molding machine for two-material molding, in a direction in which the first die plate and the second die plate approach and separate from each other,
the reversal pedestal is fixed to the base in the direction in which the first die plate and the second die plate approach and separate from each other,
the first die opening and closing means causes the first die plate to approach and separate from the reversal pedestal to open and close the first die plate, and
the second die opening and closing means causes the second die plate to approach and separate from the reversal pedestal to open and close the second die plate.

4. The injection molding machine for two-material molding according to claim 1, wherein
the heating device is a heating medium supply device that supplies a heating medium to a heat medium passage formed in at least one of the first die, the second die, and the rotary dies and heats the first cavity and/or the second cavity,
the cooling device is a cooling medium supply device that supplies a cooling medium to the heat medium passage and cools the first cavity and/or the second cavity, and
the control unit controls the supply of the heating medium and the cooling medium in the heating medium supply device and the cooling medium supply device.

5. The injection molding machine for two-material molding according to claim 1, wherein
the heating device is an electric or electromagnetic heating device formed in at least one of the first die, the second die, and the rotary dies,
the cooling device is a cooling medium supply device that supplies a cooling medium to a heat medium passage formed in at least one of the first die, the second die, and the rotary dies and cools the first cavity and/or the second cavity, and
the control unit controls supply of electricity in the electric or electromagnetic heating device and the supply of the cooling medium in the cooling medium supply device.

6. The injection molding machine for two-material molding according to claim 1, wherein
the die tightening means is driven by a hydraulic cylinder, and
the first die opening and closing means and the second die opening and closing means are respectively driven by electric motors.

7. The injection molding machine for two-material molding according to claim 6, wherein
the first die opening and closing means includes a ball screw shaft driven by the electric motor and a ball screw nut attached to the second die plate and screwed with the ball screw shaft, and
the second die opening and closing means includes a ball screw shaft driven by the electric motor and a ball screw nut attached to the reversal pedestal and screwed with the ball screw shaft.

8. The injection molding machine for two-material molding according to claim 6, wherein the first die opening and closing means includes a ball screw shaft driven by the electric motor fixed to the first die plate or the base of the injection molding machine for two-material molding and a ball screw nut attached to the second die plate and screwed with the ball screw shaft.

9. The injection molding machine for two-material molding according to claim 6, wherein the first die opening and closing means includes a ball screw shaft driven by the electric motor fixed to the reversal pedestal, the ball screw shaft being rotatably supported via a ball bearing on a support table fixedly provided in the reversal pedestal, and a ball screw nut fixedly provided in the second die plate and screwed with the ball screw shaft.

* * * * *